United States Patent [19]

Birdwell

[11] Patent Number: 4,610,762
[45] Date of Patent: Sep. 9, 1986

[54] METHOD FOR FORMING POLYMER FILMS HAVING BUBBLE RELEASE SURFACES

[75] Inventor: Jeffrey D. Birdwell, Lake Jackson, Tex.

[73] Assignee: The Dow Chemical Company, Midland, Mich.

[21] Appl. No.: 739,933

[22] Filed: May 31, 1985

[51] Int. Cl.$^4$ ............................................. C25G 1/14
[52] U.S. Cl. .................................... 204/1 R; 204/98; 204/128; 204/283; 204/252; 204/296; 764/127; 764/317; 764/334; 764/337; 521/27
[58] Field of Search ................. 521/27; 204/98, 1 R, 204/128, 296, 283, 252; 264/317, 337, 127, 334

[56] References Cited

U.S. PATENT DOCUMENTS

| | | | |
|---|---|---|---|
| 2,595,734 | 5/1952 | Toulmiv, Jr. | 264/334 |
| 3,190,947 | 6/1965 | Norcross | 264/334 |
| 3,202,733 | 8/1965 | Strauss | 264/127 |
| 3,282,875 | 11/1966 | Connolly et al. | 260/29.6 |
| 3,306,956 | 2/1967 | Barnette | 264/337 |
| 3,463,848 | 8/1969 | St. Clair | 264/317 |
| 3,692,569 | 9/1972 | Grot | 117/138.8 UF |
| 3,909,378 | 9/1975 | Walmsley | 204/98 |
| 4,025,405 | 5/1977 | Dotson et al. | 204/98 |
| 4,065,366 | 12/1977 | Oda et al. | 204/98 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,147,844 | 4/1979 | Babinsky et al. | 521/27 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Munekata et al. | 560/183 |
| 4,212,713 | 7/1980 | Suhara et al. | 204/98 |
| 4,251,333 | 2/1981 | Suhara et al. | 204/98 |
| 4,259,226 | 3/1981 | Suhara et al. | 260/33.4 F |
| 4,270,996 | 6/1981 | Suhara et al. | 204/98 |
| 4,298,697 | 11/1981 | Baczek et al. | 521/27 |
| 4,323,434 | 4/1982 | Yoshida et al. | 204/98 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 F |
| 4,340,680 | 7/1982 | Asawa et al. | 521/27 |
| 4,348,310 | 9/1982 | Silva et al. | 524/167 |
| 4,349,422 | 9/1982 | Maloney | 204/98 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,417,969 | 11/1983 | Ezzell et al. | 204/252 |
| 4,437,952 | 3/1984 | Smith et al. | 204/98 |
| 4,457,815 | 7/1984 | Levin | 204/98 |
| 4,462,877 | 7/1984 | Ezzell | 204/98 |
| 4,468,301 | 8/1984 | Oda et al. | 204/98 |
| 4,470,889 | 9/1984 | Ezzell et al. | 204/98 |
| 4,478,695 | 10/1984 | Ezzell et al. | 204/98 |
| 4,537,910 | 8/1985 | Oogai et al. | 521/27 |

FOREIGN PATENT DOCUMENTS

| | | |
|---|---|---|
| 0027009 | 4/1981 | European Pat. Off. |
| 0122049 | 10/1984 | European Pat. Off. |
| 2051091A | 1/1981 | United Kingdom |
| 2060703A | 5/1981 | United Kingdom |
| 2064586A | 6/1981 | United Kingdom |
| 2066824A | 7/1981 | United Kingdom |

OTHER PUBLICATIONS

"Dual Cohesive Energy Densities of Perfluorosulfonic Acid (Nafion) Membrane", Richard, S. Yeo, *Polymer*, p. 432, vol. 21, Apr. 1980.

"Solubility Characteristics of Perfluorinated Polymers with Sulfonyl Fluoride Functionality", G. H. McCain and M. J. Covitch, *Journal Electrochemical Society: Electrochemical Science and Technology*, Jun. 1984, pp. 1350-1352.

*Primary Examiner*—R. L. Andrews
*Attorney, Agent, or Firm*—James H. Dickerson

[57] ABSTRACT

The invention is a method for forming polymer films having a roughened surface using removable substrates comprising:

(a) providing a removable substrate with a roughened surface;
(b) forming a dispersion of a perfluorinated polymer containing sites convertible to ion exchange groups in a dispersant having: a boiling point less than about 110° C.; a density of from about 1.55 to about 2.2; and a solubility parameter of from greater than about 7.1 to about 8.2 hildebrands;
(c) depositing the dispersion onto the roughened, removable substrate;
(d) removing the dispersant from the dispersion; and
(e) removing the substrate.

Particularly preferred as a dispersant is a compound represented by the general formula:

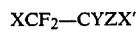

$$XCF_2-CYZX'$$

wherein:
X is selected from the group consisting of F, Cl, Br, and I;
X' is selected from the group consisting of Cl, Br, and I;
Y and Z are independently selected from the group consisting of H, F, Cl, Br, I and R';
R' is selected from the group of perfluoroalkyl radicals and chloroperfluoroalkyl radicals having from 1 to 6 carbon atoms.

The most preferred dispersant is 1,2-dibromotetrafluoroethane.

55 Claims, No Drawings

METHOD FOR FORMING POLYMER FILMS HAVING BUBBLE RELEASE SURFACES

The invention is a method for forming polymer films having bubble release surfaces and particularly for forming ion exchange active membranes having bubble release surfaces.

BACKGROUND OF THE INVENTION

Ion exchange active fluoropolymer films have been widely used in industry, particularly as ion exchange membranes in chlor-alkali cells. Such membranes are made from fluorinated polymers having ion exchange active groups attached to pendant groups from the polymeric backbone.

It has been found that ion exchange membranes frequently operate more efficiently if their surface is roughened. This is especially true when such membranes are used in processes where a gas is generated adjacent to the membrane. Roughened membranes release the gas from its surface and does not result in gas blinding of the membrane. However, the preparation of such roughened membrane surfaces is difficult. A simple method for producing roughened membranes would be highly desirable.

It has also been found than ion exchange membranes frequently operate more efficiently if the surface is roughened or has electrically inactive particles embedded into its surface. Such particles also cause gas bubbles to be released from the surface of the membrane. However, prior art method for producing such membranes is not entirely satisfactory because such membranes require specialized materials and additional process steps to the finished membrane.

U.S. Pat. No. 4,457,815 discloses a permionic membrane having a porous film or surface and electrocatalyst on at least one surface thereof. Also disclosed in an electrolytic cell with the permionic membrane, an electrolytic process utilizing the permionic membrane, and an electrolytic process utilizing electrolytic cell.

U.S. Pat. No. 4,349,422 discloses a process and cell for electrolysis of alkali metal halides, especially sodium chloride, wherein the anolyte and the catholyte compartments are separated by a fluorinated ion exchange membrane whose surface facing the catholyte compartment is of a polymer having carboxylic functionality and which has a roughened surface which does not excell 1.5 microns. Such a cell and process operate at high current efficiency, low voltage and low power consumption.

U.S. Pat. No. 4,468,301 discloses a process for the electrolysis of an aqueous alkali metal chloride in a cell which comprises an anode and a cathode which are partitioned by an ion exchange membrane having at least one roughened surface. The electrodes are spaced apart in non-contacting relationship from the membrane surface up to a distance of no more than 2 millimeters.

European Patent Application No. 0,122,049 discloses an unreinforced ion exchange membrane which comprises fluorinated polymer which has carboxylic functional groups, which has a hydrogen bubble release layer on the cathode side thereof, and which has channels open to the outer surface of the anode-facing side thereof. Precursor membrane, which may contain partially embedded sacrificial members, and from which the unreinforced ion exchange membrane is made, is also disclosed. The unreinforced ion exchange membrane can be used to separate the compartments of a chlor-alkali cell, and such a cell operates at low voltage, high current efficiency, and low power consumption.

A method for quickly and easily manufacturing ion exchange membranes having a bubble release layer would be highly desirable. It is the purpose of this invention to provide such a method.

SUMMARY OF THE INVENTION

The invention is a method for forming polymer films having a roughened surface using removable substrates comprising:

(a) providing a removable substrate with a roughened surface;

(b) forming a dispersion of a perfluorinated polymer containing sites convertible to ion exchange groups and a dispersant having: a boiling point less than about 110° C.; a density of from about 1.55 to about 2.97 grams per cubic centimeter; and a solubility parameter of from greater than about 7.1 to about 8.2 hildebrands;

(c) depositing the dispersion onto the roughened, removable substrate;

(d) removing the dispersant from the dispersion; and (e) removing the substrate.

Particularly preferred is a dispersant having the general formula:

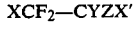

wherein:

X is selected from the group consisting of F, Cl, Br, and I;

X' is selected from the group consisting of Cl, Br, and I;

Y and Z are independently selected from the group consisting of H, F, Cl, Br, I and R';

R' is selected from the group of perfluoroalkyl radicals and chloroperfluoroalkyl radicals having from 1 to 6 carbon atoms.

The most preferred dispersant is 1,2-dibromotetrafluoroethane.

DETAILED DESCRIPTION OF THE INVENTION

The method of the present invention forms an ion exchange membrane having a surface of a controlled roughness by a unique process which is easier, more direct, and more easily controlled than prior art methods. The present process and the article are useful in making novel membranes for ion exchange, osmosis and other such applications. The membranes are particularly useful for ion exchange membranes for chlor-alkali electrolytic cells.

The process of the present invention involves at least a portion of the following steps:

(a) providing a roughened surface by etching using blasting, grinding, milling or chemical means;

(b) forming a dispersion coating with a dispersant and a polymer;

(c) applying the dispersion to the desired thickness onto the roughened surface;

(d) fusing the coating into place on the roughened surface; and (e) physically or chemically removing the substrate.

"Dispersion" as used herein, means a composition containing a dispersant and a perfluorinated polymer containing sites convertible to ion exchange groups.

The polymer is at least partially dissolved in the dispersant and is dispersed into the dispersant.

The present invention can be used to make ion exchange media, films and articles for use in electrolytic cells, fuel cells and gas or liquid permeation units.

The present invention may also be used to form superior solid polymer electrolyte membranes or fuel cell membranes with enhanced bonding and transport to the conductive and catalytic layers, i.e. the replicated surface of the film having fine orders of roughness allowing better adhesion to the catalyst and conductive particles. This allows more intimate contact than the smooth surface from ordinary fabrication.

Non-ionic forms of perfluorinated polymers described in the following patents are suitable for use in the present invention: U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European Patent Application No. 0,027,009. These polymers have equivalent weights from about 500 to about 2000.

Particularly preferred are copolymers of monomer I with monomer II (as defined below). Optionally, a third type of monomer may be copolymerized with I and II.

The first type of monomer is represented by the general formula:

$$CF_2=CZZ' \qquad (I)$$

where:

Z and Z' are independently selected from the group consisting of —H, —Cl, —F, or $CF_3$.

The second monomer consists of one or more monomers selected from compounds represented by the general formula:

$$Y-(CF_2)_a-(CFR_f)_b-(CFR'_f)_c-O-[CF(CF_2X)-CF_2-O]_n-CF=CF_2 \qquad (II)$$

where:

Y is selected from the group consisting of —$SO_2Z$, —CN, —COZ and $C(R^3_f)(R^4_f)OH$;

Z is I, Br, Cl, F, OH, or $NR_1R_2$;

R is a branched or linear alkyl radical having from 1 to about 10 carbon atoms or an aryl radical;

$R^3_f$ and $R^4_f$ are independently selected from the group consisting of perfluoroalkyl radicals having from 1 to about 10 carbon atoms;

$R_1$ and $R_2$ are independently selected from the group consisting of H, a branched or linear alkyl radical having from 1 to about 10 carbon atoms or an aryl radical;

a is 0–6;

b is 0–6;

c is 0 or 1;

provided a+b+c is not equal to 0;

X is Cl, Br, F or mixtures thereof when n>1;

n is 0 to 6; and $R_f$ and $R'_f$ are independently selected from the group consisting of F, Cl, perfluoroalkyl radicals having from 1 to about 10 carbon atoms and fluorochloroalkyl radicals having from 1 to about 10 carbon atoms.

Particularly preferred is when Y is —$SO_2F$ or —$COOCH_3$; n is 0 or 1; $R_f$ and $R'_f$ are F; X is Cl or F; and a+b+c is 2 or 3.

The third and optional monomer suitable is one or more monomers selected from the compounds represented by the general formula:

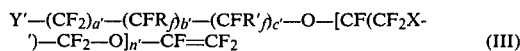
$$Y'-(CF_2)_{a'}-(CFR_f)_{b'}-(CFR'_f)_{c'}-O-[CF(CF_2X')-CF_2-O]_{n'}-CF=CF_2 \qquad (III)$$

where:

Y' is F, Cl or Br;

a' and b' are independently 0–3;

c' is 0 or 1;

provided a'+b'+c' is not equal to 0;

n' is 0–6;

$R_f$ and $R'_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and X' is F, Cl, Br, or mixtures thereof when n'>1.

Conversion of Y to ion exchange groups is well known in the art and consists of reaction with an alkaline solution.

The monomer $FSO_2CF_2CF_2OCF=CF_2$ has a density of about 1.65 grams per cubic centimeter and polytetrafluoroethylene has a density of about 2.2 grams per cubic centimeter. A copolymer of this monomer with tetrafluoroethylene would, thus, have a density between the two values.

It has been discovered that certain perhalogenated dispersants have a surprising effect of dispersing the polymers, especially when the polymers are in a finely divided state.

Dispersants suitable for use in the present invention preferably have the following characteristics:

a boiling point less than about 110° C.;

a density of from about 1.55 to about 2.97 grams per cubic centimeter;

a solubility parameter of from greater than about 7.1 to about 8.2 hildebrands.

It is desired that the dispersant has a boiling point of from about 30° C. to about 110° C. The ease of removal of the dispersant and the degree of dispersant removal is important in the producing of various films, coatings and the like, without residual dispersant; hence a reasonable boiling point at atmospheric pressure allows convenient handling at room conditions yet effective dispersant removal by atmospheric drying or mild warming.

It is desired that the dispersant has a density of from about 1.55 to about 2.97 grams per cubic centimeter. The polymers of the present invention have densities on the order of from about 1.55 to about 2.2 grams per cubic centimeter. Primarily, the polymers have densities in the range of from about 1.6 to about 2.2 grams per cubic centimeter. Dispersants of the present invention will therefore swell dissolve and disperse small particles of this polymer, aided by the suspending effects of the similarity in densities.

The prior art did not balance density. They were interested in forming solutions and solutions do not separate.

Solubility parameters are related to the cohesive energy density of compounds. Calculating solubility parameters are discussed in U.S. Pat. No. 4,348,310, the teachings of which are incorporated by reference for the purposes of their teachings on solubility parameters.

It is important that the dispersant has a solubility parameter of from greater than about 7.1 to about 8.2 hildebrands. The similarity in cohesive energy densities between the dispersant and the polymer determine the likelihood of dissolving, swelling and dispersing the polymer in the dispersant.

It is preferable that the dispersant has a vapor pressure of up to about 760 millimeters of mercury at the specified temperature limits at the point of dispersant removal. The dispersant should be conveniently removed without the necessity of higher temperatures or reduced pressures involving extended heating such as would be necessary in cases similar to U.S. Pat. No. 3,692,569 or the examples in British Pat. No. 2,066,824A in which low pressures (300 millimeters) had to be employed as well as non-solvents to compensate for the higher boiling points and low vapor pressures of the complex solvents.

It has been found that dispersants represented by the following general formula are particularly preferred provided they also meet the characteristics discussed above (boiling point, density, and solubility parameter):

$$XCF_2—CYZ—X'$$

wherein:

X is selected from the group consisting of F, Cl, Br, and I;

X' is selected from the group consisting of Cl, Br, and I;

Y and Z are independently selected from the group consisting of H, F, Cl, Br, I and R';

R' is selected from the group of perfluoroalkyl radicals and chloroperfluoroalkyl radicals having from 1 to 6 carbon atoms.

The most preferred dispersants are 1,2-dibromotetrafluoroethane (commonly known as Freon 114 B 2)

$$BrCF_2—CF_2Br$$

and 1,2,3-trichlorotrifluoroethane (commonly known as Freon 113):

$$ClF_2C—CCl_2F$$

Of these two dispersants, 1,2-dibromotetrafluoroethane is the most preferred dispersant. It has a boiling point of about 47.3° C., a density of about 2.156 grams per cubic centimeter, and a solubility parameter of about 7.2 hildebrands.

1,2-dibromotetrafluoroethane is thought to work particularly well because, though not directly polar, it is highly polarizable. Thus, when 1,2-dibromotetrafluoroethane is associated with a polar molecule, its electron density shifts and causes it to behave as a polar molecule. Yet, when 1,2-dibromotetrafluoroethane is around a non-polar molecule, it behaves as a non-polar dispersant. Thus, 1,2-dibromotetrafluoroethane tends to dissolve the non-polar backbone of polytetrafluoroethylene and also the polar, ion-exchange-containing pendant groups. Its solubility parameter is calculated to be from 7.13 to 7.28 hildebrands.

It is surprising that an off-the-shelf, readily-available compound such as 1,2-dibromotetrafluoroethane would act as a solvent for the fluoropolymers described above. It is even more surprising that 1,2-dibromotetrafluoroethane happens to have a boiling point, a density and a solubility parameter such that it is particularly suitable for use as a solvent/dispersant in the present invention.

In practicing the present invention, the polymer may be in any physical form. However, it is preferably in the form of fine particles to speed dissolution and dispersion of the particles into the dispersant. Preferably, the particle size of the polymers is from about 0.01 microns to about 840 microns. Most preferably, the particle size is less than about 250 microns.

To dissolve and disperse the polymer particles into the dispersant, the polymer particles are placed in contact with the dispersant of choice and intimately mixed. The polymer and the dispersant may be mixed by any of several means including, but not limited to, shaking, stirring, milling or ultra sonic means. Thorough, intimate contact between the polymer and the dispersant are needed for optimum dissolution and dispersion.

The polymers of the present invention are dissolved and dispersed into the dispersants at concentrations ranging from about 0.1 to about 50 weight percent of polymer to dispersant. At concentrations below about 0.1 weight percent, there is insufficient polymer dissolved and dispersed to be effective as a medium for coating of articles or forming films within a reasonable number of repetitive operations. Conversely, at concentrations above about 50 weight percent there is sufficient polymer present as a separate phase such that viable, coherent films and coatings of uniform structure cannot be formed without particulate agglomerates, etc.

Preferably, the concentration of the polymer in the dispersant is from about 0.1 to about 20 weight percent. More preferably, the concentration of the polymer in the dispersant is from about 0.3 to about 10 weight percent. Most preferably, the concentration is from about 5 to 15 weight percent.

The dispersion of the polymer into the dispersant can be conducted at room temperature conditions. However, the optimum dispersion effects are best achieved at temperatures from about 10° C. to about 50° C. At temperatures above about 50° C. the measures for dissolving and dispersing the polymer have to include pressure confinement for the preferred dispersants or method of condensing the dispersants. Conversely, at temperatures below about 10° C. many of the polymers of the present invention are below their glass transition temperatures thus causing their dispersions to be difficult to form at reasonable conditions of mixing, stirring, or grinding.

The dispersion of the polymers of the present invention into the dispersant are best conducted at atmospheric pressure. However, dispersion effects can be achieved at pressures from about 760 to about 15,000 millimeters mercury or greater. At pressures below about 760 millimeters mercury, the operation of the apparatus presents no advantage in dissolving and dispersing polymers, rather hindering permeation into the polymers and thus preventing forming of the dispersions.

Conversely, pressures above about 760 millimeters mercury aid in dissolving and dispersing polymers very little compared to the difficulty and complexity of the operation. Experiments have shown that at about 20 atmospheres the amount of polymer dissolved and dispersed in the dispersant is not appreciably greater.

After the polymer dispersions of the present invention have been formed, they may be fixed to other polymer films or substrates by sintering or compression to fix the polymer from the dispersion to the substrate.

The following methods are suitable for fixing the dispersion of the present invention to a substrate. Dipping the substrate into the dispersion, followed by air drying and sintering at the desired temperature with sufficient repetition to build the desired thickness. Spraying the dispersion onto the substrate is used to advantage for covering large or irregular shapes. Pouring the dispersion onto the substrate is sometimes used. Painting the dispersion with brush or roller has been successfully employed. In addition, coatings may be easily applied with metering bars, knoves, or rods. Usually, the coatings or films are built up to the thickness desired by repetitive drying and sintering.

Roughened membranes are described in U.S. Pat. Nos. 4,323,434; 4,468,301; and 4,349,422. These patents are incorporated by reference for the purposes of the roughness values they teach.

The surface roughness can be formed by almost any surface treating means including air blasting such things as alumina, sand, zirconium oxide or the like; belt sanders; oscillating wire brush; chemical etching or other well-known techniques.

The roughening process for the substrate is carried out by either spraying a surface or chemically etching a surface to the desired degree or roughness. The roughness of the polymer film (membrane surface) is determined by the conformation of the polymer to the roughened surface.

The roughening process may embed particles into the roughened substrate. These particles may be left in the substrate and, when later used to form polymer films, may become a part of the film. This provides a simple means for forming membranes having bubble release particles in their surface.

This can be carried out by the following procedure: The roughened surface is prepared. A dispersion is applied to the roughened surface. The dispersant is removed leaving the polymer conforming to the surface. If desired, the polymer and substrate can be further treated by fusing, sintering or pressing to aid in the forming process. The film is then separated from the removable substrate by well-known physical or chemical means.

The type of substrate upon which the dispersion of the present invention may be applied can be any roughenable surface including such things as aluminum foil, glass, wood and metals.

The substrate upon which the dispersion is to be deposited may optionally be cleaned or treated in such a way as to assure uniform contact with the dispersion. The substrate can be cleansed by washing with a degreaser or similar solvent followed by drying to remove any dust or oils from objects to be used as substrates. Metals may be acid etched, then washed with a solvent to promote adhesion, if desired, unless the metal is new in which case degreasing is sufficient.

After being cleaned, the substrates may be pre-conditioned by heating or vacuum drying prior to contact with the dispersions and the coating operation. Temperatures and pressures in the following ranges are preferably used: about 20 millimeters mercury at about 110° C. or thereabout is sufficient in all cases; however, mild heat is usually adequate, on the order of about 50° C. at atmospheric pressure.

After preparation, the substrates are coated with the dispersion by any of several means including, but not limited to, dipping, spraying, brushing, pouring. Then the dispersion may be evened out using scraping knives, rods, or other suitable means. The dispersion can be applied in a single step or in several steps depending on the concentration of the polymer in the dispersion and the desired thickness of the coating or film.

Follqwing the application of the dispersion, the dispersant is removed by any of several methods including, but not limited to, evaporation or extraction. Extraction is the use of some agent which selectively dissolves or mixes with the dispersant but not the polymer.

The dispersant removal is typically carried out by maintaining the coated substrate at temperatures ranging from about 10° C. to about 110° C., with the preferred heating range being from about 20° C. to about 100° C. The heating temperature selected depends upon the boiling point of the dispersant.

Heating temperatures are customarily in the range of from about 20° C. to about 50° C. for 1,2-dibromotetrafluoroethane.

The pressures employed for the removal of the dispersant from the coated substrate can range from about 20 mm mercury to about 760 mm mercury depending on the nature of the dispersant, although pressures are typically in the range of from about 300 mm mercury to about 760 mm mercury for 1,2-dibromotetrafluoroethane.

The forming of the coating or film can be carried out as part of the polymer deposition and dispersant removal process or as a separate step by adjusting the thermal and pressure conditions associated with the separation of the polymer from the dispersant. If the dispersion is laid down in successive steps, a continuous film or coating free from pinholes can be formed without any subsequent heating above ambient temperature by control of the rate of evaporation. This can be done by vapor/liquid equilibrium in a container or an enclosure; therefore, the dispersant removal step can be merely a drying step or a controlled process for forming a coating or film. If the dispersant is removed as by flash evaporation, a film will not form without a separate heating step.

After the dispersant has been removed, the residual polymer and substrate, as a separate step, is preferably subjected to a heat source of from about 150° C. to about 380° C. for times ranging from about 10 seconds to about 120 minutes, depending upon the thermoplastic properties of the polymers. The polymers having melt viscosities on the order of $5 \times 10^5$ poise at about 300° C. at a shear rate of 1 sec.$^{-1}$ as measured by a typical capillary rheometer would require the longer times and higher temperatures within the limits of the chemical group stability. Polymers with viscosities on the order of 1 poise at ambient temperatures would require no further treatment.

The most preferred treatment temperatures are from about 270° C. to about 350° C. and a time of from about 0.2 to about 45 minutes for the most preferred polymers for use in the present invention. Such polymers form thin continuous films under the conditions described above.

A variety of means can be used to remove the substrate including chemically etching the substrate away, vaporizing the substrate, dissolving the substrate, peeling the substrate from the film, peeling the film from the substrate, and other physical or chemical means.

Films of varying thicknesses can be easily produced by the methods and means described above. Such films are suitable as membranes, when in their ionic forms, for use in electrochemical cells. They are particularly useful for the electrolysis of sodium chloride brine solutions to produce chlorine gas and sodium hydroxide solutions. Membranes prepared according to the present invention have surprisingly good current efficiencies when used in chlor-alkali cells.

EXAMPLES

Example 1

A sheet of aluminum foil about 2 mils (50.8 microns) thick soft drawn is etched with 300 grit alumina to impart an irregular, sharply featured surface to the aluminum foil. This left some of the particulates embedded in the foil.

A copolymer of $CF_2=CF_2$ and $CF_2=CFOCF_2CF_2CO_2CH_3$ is prepared having an equivalent weight of about 755. About 50 grams of $CF_2=CFOCF_2CF_2CO_2CH_3$ is added to about 300 grams of deoxygenated water containing about 3.0 grams $NH_4O_2CC_7F_{15}$, about 1.5 grams of $Na_2HPO_4.7H_2O$, about 1.0 gram of $NaH_2PO_4.H_2O$ and about 0.10 gram of $(NH_4)_2S_2O_8$ under a positive pressure of tetrafluoroethylene of about 235 psig pressure at about 50° C. for about 5 hours in a glass reactor. The reactor is vented and the reactor contents is acidified with about 6 normal HCl to coagulate the latex. The coagulam is filtered and washed vigorously to remove inorganics and soap. The polymer is vacuum dried for about 16 hours at about 85° C. About 15 grams of the polymer prepared above is ground in a lab mortar and pestle with about 135 grams of 1,2-dibromotetrafluoroethane to produce a viscous dispersion. The dispersion is used to coat the sheet of aluminum foil prepared above.

The coating is fused for five minutes at 250° C. and the coating procedure is repeated a sufficient number of times to accumulate an 0.8 (23.2 microns) thick coating on the foil.

The coated side of the foil is placed against a 4 mil (101.6 microns) thick film of an 850 equivalent weight fluorosulfonyl vinyl ether/tetrafluoroethylene copolymer. The 850 equivalent weight fluorosulfonyl vinyl ether tetrafluoroethylene copolymer is prepared according to the following procedure: About 784 grams of $CF_2=CFOCF_2CF_2SO_2F$ is added to about 4700 grams of deoxygenated water containing about 25 grams $NH_4O_2CC_7F_{15}$, about 18.9 grams of $Na_2HPO_4.7H_2O$, about 15.6 grams of $NaH_2PO_4.H_2O$ and about 4 grams of $(NH_4)_2S_2O_8$ under a positive pressure of about 192 pounds per square inch gauge (psig) of tetrafluoroethylene at about 60° C. for about 88 minutes. The reactor is vented under heat and vacuum to remove residual monomers. The reactor contents is frozen, thawed, and vigorously washed to remove residual salts and soap.

The dried polymer is extruded at about 500° F. (about 260° C.) to about 550° F. (about 288° C.) using a Haake Rheomex 254 three-fourths inch vented 25:1 length/diameter 316 stainless steel screw extruder and a six inch die. With a 20 mil (about 508 microns) die gap, the film is drawn down to about 4-5 mils (about 101 to about 127 microns) thickness and quenched on an unheated 316 stainless steel roll. The cast film samples are cleaned by degreasing with acetone and air dried.

The so-prepared coated aluminum foil and the film are placed between two sheets of polytetrafluoroethylene covered glass cloth and this all in turn is placed between two photographic plates. The composite sandwich is pressed for 5 minutes at about 800 psi force and 250° C. on a hydraulic hot press. The composite film and foil is then removed from the press and placed in a 25 weight percent aqueous sodium hydroxide bath at 70° C. for 4 hours to remove the foil and hydrolyze the films. The membrane film is now in the sodium form and is suitable for use in a minimum brine gap chlor-alkali cell.

Inspection of the surface with an optical microscope shows finely detailed roughness with sharp points and some grit particles adhering to the points where it is left after the foil is eaten away.

A chlor-alkali test cell is constructed to test the so-formed ion exchange membrane. The cell has an exposed electrode surface of about 8.65 square inch with a titanium anode compartment and a plexiglass cathode compartment. The anode is a ruthenium oxide coated expanded metal electrode. A cathode having an electrocatalyst on its surface was used. Brine containing about 20 weight percent sodium chloride is introduced into the anode compartment and water is added to the cathode compartment as the direct current is passed through the electrodes at about 2 amps per square inch of electrode surface area. The membrane is disposed between the electrodes and bolted between the two cell halves with gas exits and overflows from each half. The membrane performs well in the chlor-alkali test cell.

I claim:

1. A method for forming polymer films having a roughened surface using removal substrates comprising:
   (a) providing a removable substrate with a roughened surface;
   (b) forming a dispersion of a perfluorinated polymer containing sites convertible to ion exchange groups and a dispersant having: a boiling point less than about 110° C.; a density of from about 1.55 to about 2.97 grams per cubic centimeter; and a solubility parameter of from greater than about 7.1 to about 8.2 hildebrands;
   (c) depositing the dispersion onto the roughened, removable substrate;
   (d) removing the dispersant from the dispersion; and
   (e) removing the substrate.

2. The method of claim 1 wherein the perfluorinated polymer is a copolymer of a first type of monomer and a second type of monomer:
   wherein the first type of monomer is represented by the general formula:

$$CF_2=CZZ' \quad (I)$$

where:

Z and Z' are independently selected from the group consisting of —H, —Cl, —F, or $CF_3$;

second monomer represented by the general formula:

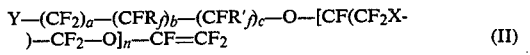

$$Y-(CF_2)_a-(CFR_f)_b-(CFR'_f)_c-O-[CF(CF_2X)-CF_2-O]_n-CF=CF_2 \quad (II)$$

where:

Y is selected from the group consisting of —$SO_2Z$, —CN, —COZ and $C(R^3_f)(R^4_f)OH$;

Z is I, Br, Cl, F, OH, or $NR_1R_2$;

R is a branched or linear alkyl radical having from 1 to about 10 carbon atoms or an aryl radical;

$R^3_f$ and $R^4_f$ are independently selected from the group consisting of perfluoroalkyl radicals having from 1 to about 10 carbon atoms;

$R_1$ and $R_2$ are independently selected from the group consisting of H, a branched or linear alkyl radical having from 1 to about 10 carbon atoms or an aryl radical;

a is 0-6;

b is 0–6;
c is 0 or 1;
provided a+b+c is not equal to 0;
X is Cl, Br, F or mixtures thereof when n>1;
n is 0 to 6; and
$R_f$ and $R'_f$ are independently selected from the group consisting of F, Cl, perfluoroalkyl radicals having from 1 to about 10 carbon atoms and fluorochloroalkyl radicals having from 1 to about 10 carbon atoms.

3. The method of claim 2 wherein the perfluorinated polymer is a copolymer formed from three types of monomers wherein the third type of monomer is one or more monomers represented by the general formula:

$$Y'-(CF_2)_{a'}-(CFR_f)_{b'}-(CFR'_f)_{c'}-O-[CF(CF_2X')-CF_2-O]_{n'}-CF=CF_2 \quad (III)$$

where:
Y' is F, Cl or Br;
a' and b' are independently 0–3;
c' is 0 or 1;
provided a'+b'+c' is not equal to 0;
n' is 0–6;
$R_f$ and $R'_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and
X' is F, Cl, Br, or mixtures thereof when n'>1.

4. The method of claim 1 wherein the boiling point of the dispersant is from about 30° C. to about 110° C.

5. The method of claim 1 wherein the density of the dispersant is from about 1.55 to about 2.2 grams per cubic centimeter.

6. The method of claim 1 wherein the solubility parameter of the dispersant is from greater than about 7.1 to about 7.5 hildebrands.

7. The method of claim 1 wherein the density of the dispersant and the density of the polymer are both from about 1.55 to about 2.2 grams per cubic centimeter.

8. A method for forming polymer films on removable substrates comprising:
(a) roughening a surface of a removable substrate;
(b) forming a dispersion of a perfluorinated polymer containing sites convertible to ion exchange groups and a dispersant, wherein the dispersant is represented by the general formula:

$$XCF_2-CYZX'$$

wherein:
X is selected from the group consisting of F, Cl, Br, and I;
X' is selected from the group consisting of Cl, Br, and I;
Y and Z are independently selected from the group consisting of H, F, Cl, Br, I and R';
R' is selected from the group of perfluoroalkyl radicals and chloroperfluoroalkyl radicals having from 1 to 6 carbon atoms;
(c) depositing the dispersion onto a removable substrate;
(d) removing the dispersant from the dispersion; and
(e) removing the substrate.

9. The method of claim 8 wherein X and X' are Br.

10. The method of claim 8 wherein X and X' are Cl.

11. The method of claim 8 wherein the polymer is present in the dispersion at a concentration of from about 0.1 to about 50 weight percent.

12. The method of claim 8 wherein the polymer is present in the dispersion at a concentration of from about 0.3 to about 30 weight percent.

13. The method of claim 8 wherein the perfluorinated polymer is a copolymer of a first type of monomer and a second type of monomer:
wherein the first type of monomer is represented by the general formula:

$$CF_2=CZZ' \quad (I)$$

where:
Z and Z' are independently selected from the group consisting of —H, —Cl, —F, or $CF_3$;
the second monomer is represented by the general formula:

$$Y-(CF_2)_a-(CFR_f)_b-(CFR'_f)_c-O-[CF(CF_2X)-CF_2-O]_n-CF=CF_2 \quad (II)$$

where:
Y is selected from the group consisting of $-SO_2Z$, —CN, —COZ and $C(R^3_f)(R^4_f)OH$;
Z is I, Br, Cl, F, OH, or $NR_1R_2$;
R is a branched or linear alkyl radical having from 1 to about 10 carbon atoms or an aryl radical;
$R^3_f$ and $R^4_f$ independently selected from the group consisting of perfluoroalkyl radicals having from 1 to about 10 carbon atoms;
$R_1$ and $R_2$ are independently selected from the group consisting of H, a branched or linear alkyl radical having from 1 to about 10 carbon atoms or an aryl radical;
a is 0–6;
b is 0–6;
c is 0 or 1;
provided a+b+c is not equal to 0;
X is Cl, Br, F or mixtures thereof when n>1;
n is 0 to 6; and
$R_f$ and $R'_f$ are independently selected from the group consisting of F, Cl, perfluoroalkyl radicals having from 1 to about 10 carbon atoms and fluorochloroalkyl radicals having from 1 to about 10 carbon atoms.

14. The method of claim 13 wherein the perfluorinated polymer is a copolymer formed from three types of monomers wherein the third type of monomer is one or more monomers represented by the general formula:

$$Y'-(CF_2)_{a'}-(CFR_f)_{b'}-(CFR'_f)_{c'}-O-[CF(CF_2X')-CF_2-O]_{n'}-CF=CF_2 \quad (III)$$

where:
Y' is F, Cl or Br;
a' and b' are independently 0–3;
c' is 0 or 1;
provided a'+b'+c' is not equal to 0;
n' is 0–6;
$R_f$ and $R'_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and
X' is F, Cl, Br, or mixtures thereof when n'>1.

15. The method of claim 1 wherein the removable substrate is aluminum.

16. The method of claim 1 wherein the substrate is removed by dissolving the substrate with a solvent.

17. The method of claim 1 wherein the substrate is removed by dissolving the substrate with an alkaline solution.

18. The method of claim 1 wherein the substrate is roughened by air blasting the substrate.

19. The method of claim 1 wherein the substrate is roughened by chemical etching.

20. The method of claim 8 wherein the removable substrate is aluminum.

21. The method of claim 8 wherein the substrate is removed by dissolving the substrate with a solvent.

22. The method of claim 8 wherein the substrate is removed by an alkaline solution.

23. The method of claim 8 wherein the substrate is roughened by air blasting the substrate.

24. The method of claim 8 wherein the substrate is roughened by chemical etching.

25. The roughened film produced from the method of claim 1.

26. The roughened film produced from the method of claim 2.

27. The roughened film produced from the method of claim 3.

28. The roughened film produced from the method of claim 4.

29. The roughened film produced from the method of claim 5.

30. The roughened film produced from the method of claim 6.

31. The roughened film produced from the method of claim 7.

32. The roughened film produced from the method of claim 8.

33. The roughened film produced from the method of claim 9.

34. The roughened film produced from the method of claim 10.

35. The roughened film produced from the method of claim 11.

36. The roughened film produced from the method of claim 12.

37. The roughened film produced from the method of claim 13.

38. The roughened film produced from the method of claim 14.

39. The roughened film produced from the method of claim 15.

40. The roughened film produced from the method of claim 16.

41. The roughened film produced from the method of claim 17.

42. The roughened film produced from the method of claim 18.

43. The roughened film produced from the method of claim 19.

44. The roughened film produced from the method of claim 20.

45. The roughened film produced from the method of claim 21.

46. The roughened film produced from the method of claim 22.

47. The roughened film produced from the method of claim 23.

48. An electrochemical cell of the type having an anode and a cathode separated by an ion exchange membrane film, wherein the film is the film produced by the method of claim 2.

49. An electrochemical cell of the type having an anode and a cathode separated by an ion exchange membrane film, wherein the film is the film produced by the method of claim 3.

50. An electrochemical cell of the type having an anode and a cathode separated by an ion exchange membrane film, wherein the film is the film produced by the method of claim 8.

51. An electrochemical cell of the type having an anode and a cathode separated by an ion exchange membrane film, wherein the film is the film produced by the method of claim 9.

52. An electrochemical process comprising passing electrical current through an electrolyte between the anode and the cathode of the cell of claim 48.

53. An electrochemical process comprising passing electrical current through an electrolyte between the anode and the cathode of the cell of claim 49.

54. An electrochemical process comprising passing electrical current through an electrolyte between the anode and the cathode of the cell of claim 50.

55. An electrochemical process comprising passing electrical current through an electrolyte between the anode and the cathode of the cell of claim 51.

* * * * *